(12) United States Patent
Molnar et al.

(10) Patent No.: US 6,916,375 B2
(45) Date of Patent: Jul. 12, 2005

(54) PORTABLE MANUFACTURING FACILITY FOR MANUFACTURING ANTI-SLIP FLOORING AND METHOD OF MANUFACTURING

(75) Inventors: William S. Molnar, Bloomfield Hills, MI (US); Kevin J. Heinl, West Bloomfield, MI (US); Brian P. Pelto, Canton, MI (US); Joseph J. Schulte, Southgate, MI (US)

(73) Assignee: W. S. Molnar Company, Detroit, MI (US)

( * ) Notice: Subject to any disclaimer, the term of this patent is extended or adjusted under 35 U.S.C. 154(b) by 45 days.

(21) Appl. No.: 10/386,270

(22) Filed: Mar. 11, 2003

(65) Prior Publication Data

US 2003/0175429 A1 Sep. 18, 2003

Related U.S. Application Data

(60) Provisional application No. 60/363,691, filed on Mar. 12, 2002.

(51) Int. Cl.$^7$ ............................ B05B 7/16; B05B 15/12; E01H 3/02
(52) U.S. Cl. .................. 118/302; 118/326; 118/DIG. 7; 239/172

(58) Field of Search .................. 118/302, 326, 118/DIG. 7; 451/89; 239/172

(56) References Cited

U.S. PATENT DOCUMENTS

| | | | | |
|---|---|---|---|---|
| 4,562,791 A | * | 1/1986 | Porter et al. ............... | 118/326 |
| 4,618,511 A | | 10/1986 | Molnar | |
| 4,872,419 A | * | 10/1989 | Blankemeyer et al. ...... | 118/713 |
| 4,961,973 A | | 10/1990 | Molnar | |
| 5,077,137 A | | 12/1991 | Molnar | |
| 5,233,796 A | * | 8/1993 | Mazalewski, Jr. ........... | 451/89 |
| 6,190,740 B1 | * | 2/2001 | Rogers ....................... | 427/446 |

* cited by examiner

Primary Examiner—Chris Fiorilla
Assistant Examiner—Yewebdar Tadesse
(74) Attorney, Agent, or Firm—Brooks Kushman P.C.

(57) ABSTRACT

The present invention provides a truck trailer manufacturing facility for coating workpieces such as metal plates or grating sections with a thermal spray anti-slip coating that provides a durable, high coefficient of friction surface on the workpieces. The manufacturing facility of the invention includes at least one surface preparing machine and at least one coating machine housed in a truck trailer. The present invention also provides a method of coating a workpiece with the truck trailer manufacturing facility.

14 Claims, 2 Drawing Sheets

PORTABLE MANUFACTURING FACILITY FOR MANUFACTURING ANTI-SLIP FLOORING AND METHOD OF MANUFACTURING

CROSS-REFERENCE TO RELATED APPLICATIONS

This application is a claims the benefit of U.S. Provisional Application Ser. No. 60/363,691 filed Mar. 12, 2002.

BACKGROUND OF THE INVENTION

1. Field of the Invention

The present invention relates to a method of applying an anti-slip coating to plates and grates and to a portable manufacturing facility.

2. Background Art

SlipNot® Safety Flooring manufactured by the W. S. Molnar Company is an advanced anti-slip and anti-skid coating that is applied to metal plate, metal grating and other metal sections that are used in the fabrication of walking surfaces, vehicle traffic surfaces, and other work surfaces. SlipNot® Safety Flooring was originally developed for fabricating platforms, decks, and other flooring surfaces. SlipNot® is also available for stair nosings, stair treads, ladder rungs and utility vault covers.

One of the advantages inherent in SlipNot® Safety Flooring is that it has a file hard surface that maintains its coefficient of friction after years of wear. Its anti-slip characteristics provide safe, secure footing even when wet or coated with oil or grease. These advantages have led to the expansion of markets for SlipNot® Safety Flooring to include road plates used to cover trenches in roads, sidewalks and parking lots. Prior art road plates are generally uncoated steel plates that are placed over trenches in roadways as a temporary cover. The coefficient of friction of the uncoated steel plate is substantially lower than the coefficient friction of the surrounding asphalt or cement road surface. Pedestrians, cars, bicycles, and motorcycles moving over road plates can lose traction that can lead to accidents.

The conventional method of manufacturing SlipNot® Safety Flooring begins with a new metal plate or grating that is cleaned and roughened in a shot blasting machine such as a large stationary Wheelabrator® machine. After cleaning and roughening the surface, the plate or grating section is loaded into a fixture having reciprocating weld guns and a power conveyor that is permanently lodged in a manufacturing facility.

Most companies that use road plates have an existing inventory of plates in a variety of sizes and shapes that are used repeatedly to temporarily cover trenches. Even though there is a growing demand for SlipNot® Safety Flooring road plates, the cost of shipping heavy road plates from a utility company or contractor's storage location to a central manufacturing facility and loss of the use of the plates while they are being transported to the coating location and returned are significant disadvantages.

Some companies have even resorted to applying an epoxy and grit coating to comply with government safety standards. Epoxy and grit coatings are only temporarily effective due to the fact that the epoxy wears off over time. When epoxy coatings wear off or delaminate, the slippery underlying surface is re-exposed.

The above disadvantages associated with the prior art are addressed by the present invention as summarized below.

SUMMARY OF THE INVENTION

A truck trailer manufacturing facility is provided for coating workpieces such as metal plates or grating sections with a thermal spray anti-slip coating that provides a durable, high coefficient of friction surface on the workpieces. The manufacturing facility includes at least one machine for preparing the surface of a workpiece and at least one coating machine. The surface preparation machine may be a shot blasting machine, a scarifier or a grinding machine. The coating machine is preferably a welding gun having automatic wire feed and compressed air for directing the thermal spray. The welding gun is indexed across the workpiece as the workpieces move through the coating machine on power operated conveyors. The coating machine may be housed within a booth located inside the truck trailer that confines the exhaust from the welding operation including dust and products of combustion and is ducted to a filtration section that cleans the exhaust prior to venting to the atmosphere.

The trailer is provided with storage compartments for welding wire, surface preparation machines, and supplies. An air compressor and motor generator set may be separately provided or included as part of the manufacturing facility. Electrical wiring and piping for compressed air may be incorporated in the truck trailer including external connections for power and compressed air that may be obtained from stationary or portable sources.

While steel plates are the principal type of workpiece, the workpieces may also be aluminum or stainless steel plates. Steel, aluminum, or stainless steel grating can also be coated. The coating may be formed from welding wire comprising plain steel wire, cored wire having high carbon content, aluminum wire, stainless steel wire or nickel alloy wire.

These and other aspects and advantages of the invention will become apparent upon review of the attached drawings in light of the following detailed description of the invention.

DETAILED DESCRIPTION OF THE PREFERRED EMBODIMENT(S)

Figure 1:
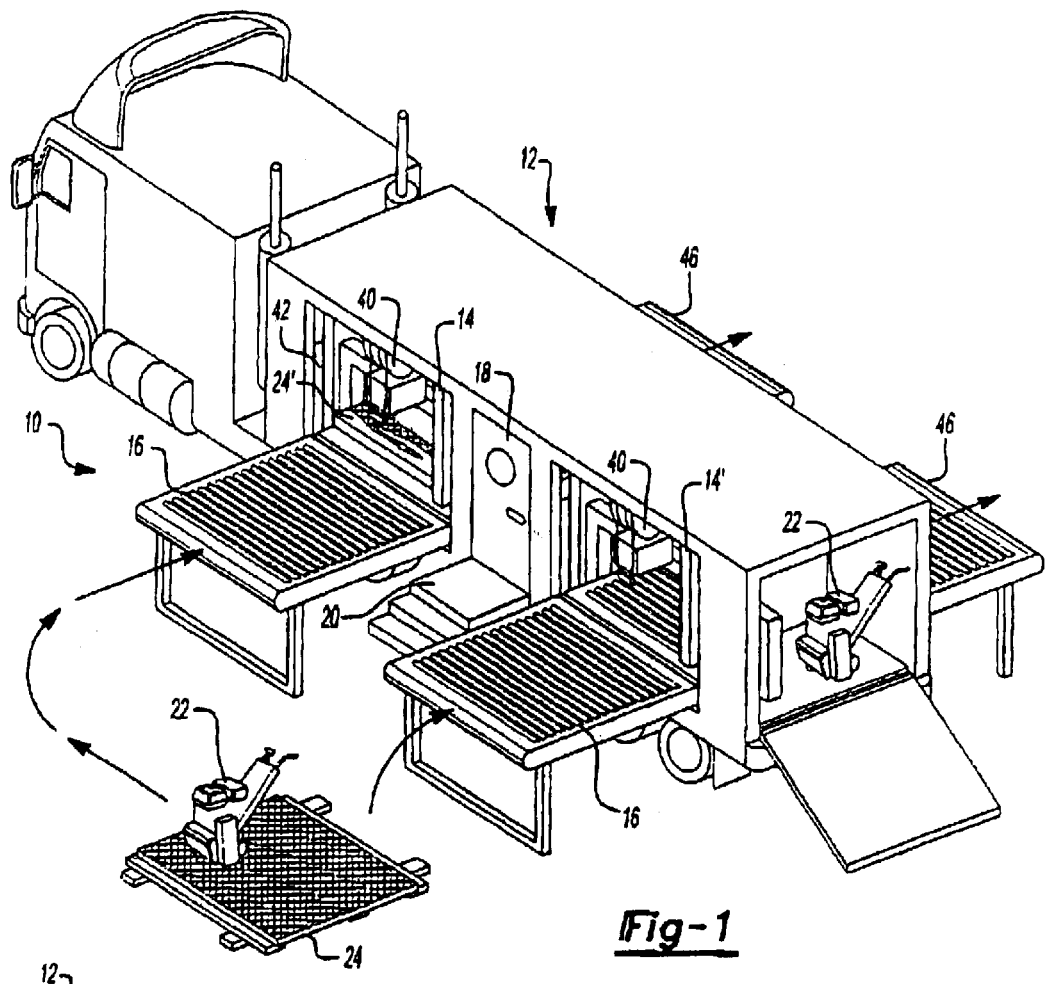
FIG. 1 is a rear/left side perspective view of a truck including a trailer that houses a manufacturing facility for coating workpieces with a thermal anti-slip coating.

Referring now to FIG. 1, a truck 10 and trailer 12 including a manufacturing facility are illustrated. At least one, and preferably two, coating booths 14 are housed within the trailer 12. Loading platforms 16 are shown in position to load the coating booths 14. The booths are shown with their side walls removed so as to not obscure the view of the welding machines 40. An access door 18 provides access through the side of the trailer 12. An ingress/egress platform 20 is provided adjacent the access door 18. An operator using the ingress/egress platform 20 may easily enter the trailer 12 by means of the access door 18 that may be provided on one or both sides of the trailer 12.

A surface preparation machine 22 is shown on a plate 24 located adjacent the trailer 12. The surface preparation machine is preferably a portable shot blasting machine. Alternatively, a portable scarifier, wire wheel or grinding machine could be used to prepare the surface of the plate 24. The plate 24 must be prepared before coating by removing oxides such as rust and forming a rough surface on the plate that aids in forming a rough, slip-resistant surface on the plate 24 after the coating is applied.

Figure 3:
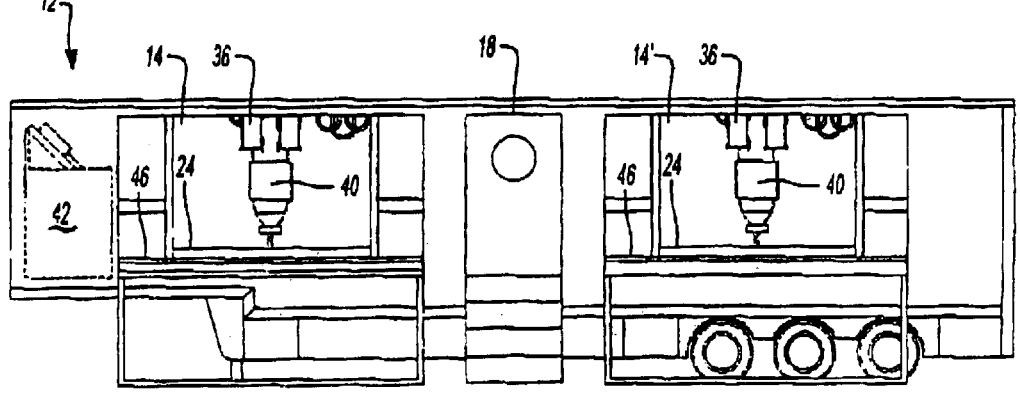
FIG. 3 is a left side elevation view of the trailer including the manufacturing facility.
Figure 2:
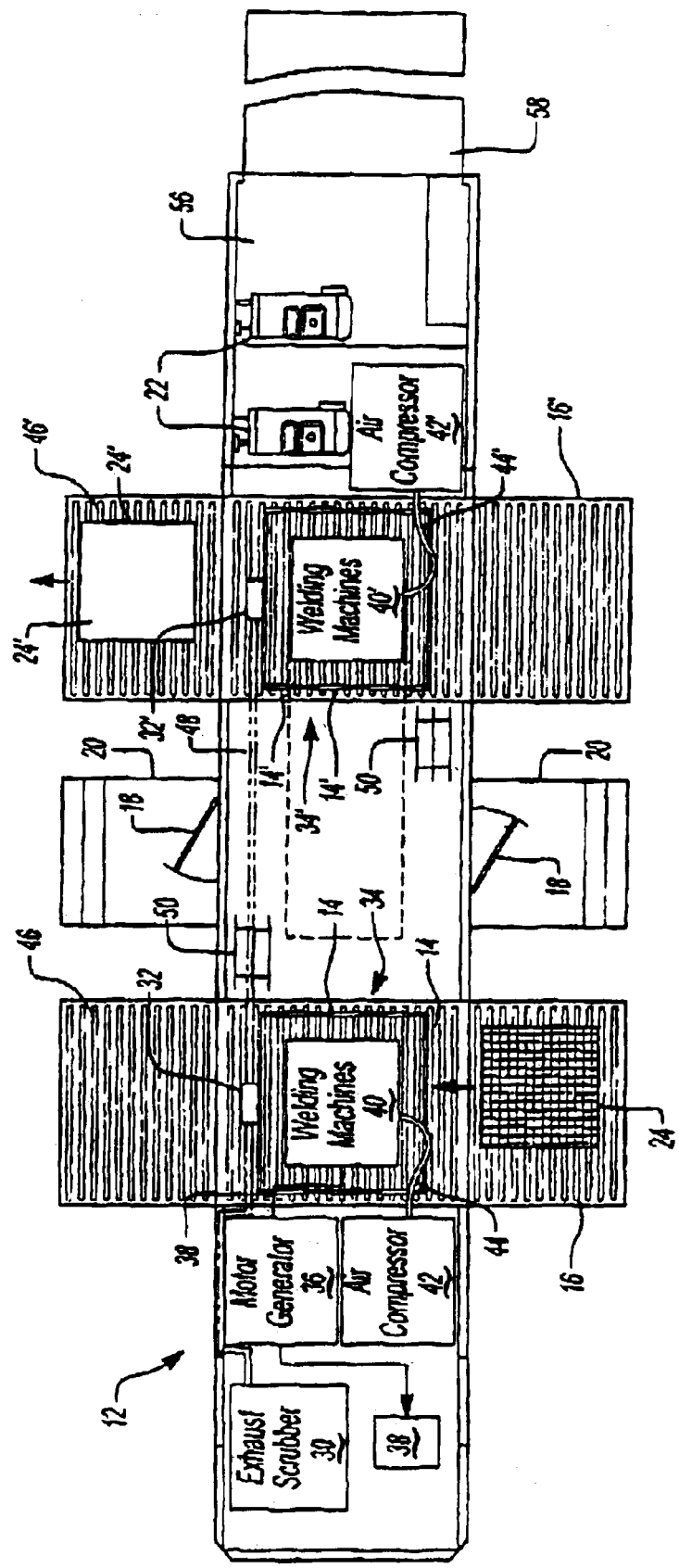
FIG. 2 is a top plan view of a trailer including the manufacturing facility.

Referring now to FIGS. 2 and 3, the trailer 12 is shown in greater detail. An exhaust scrubber 30 is preferably provided in the forward section of the trailer 12 (generally above the fifth wheel of the truck). The exhaust scrubber is connected by means of ducts 32 to hoods 34, 34' of the coating booths 14, 14'. Smoke or dust generated in the coating booths 14, 14' is collected by the hoods 34, 34' and ducts 32, 32' and directed to the exhaust scrubber 30.

A portable motor generator set 36 is shown in the forward section of the trailer 12 in FIG. 2. The portable motor generator set 36 could alternatively be provided adjacent the trailer. The portable motor generator set 36 may be connected by wiring 38 to the electrical system of the welding machines 40 or other electrically powered parts of the trailer 12. A portable air compressor 42 may also be provided independently or as part of the trailer 12. As shown in FIG. 2, air compressors 42, 42' are connected by means of hoses or piping 44, 44' to the air supply of the welding machines 40, 40'. As shown in FIG. 2, unloading platforms 46, 46' are provided on the opposite side of the trailer 12 from the loading platform 16, 16'.

Plates 24 are placed on the loading platforms 16, 16' and moved into the coating booths 14, 14' after they have been cleaned by the surface preparation machines 22. Welding machines 40, 40' metalize the surface of the plates 24. The guns may be provided with cored wire such as 1362 FC type wire that may be obtained from Cor-Met Inc., other types of wire, or combinations thereof. The welding machines 40, 40' have a plurality of welding guns that are moved across the plates 24 as the plates 24 are moved through the coating booths 14, 14'. The welding guns are mounted on a carriage that is moved on a track by a motor in conjunction with a rack and pinion or worm gear. Alternatively, a drive cylinder could be used to reciprocally move the guns. While a pneumatic motor or cylinder would be preferred, it is anticipated that electric or hydraulic drives could also be used. When the plates 24 have been coated, the coating forms an anti-slip surface and they are referred to as coated plates 24'.

As shown in FIGS. 2 and 3, an operator room or station 48 is provided between the two adjacent coating booths 14, 14'. From the operator room 48, the operation of the welding machines 40, 40' may be monitored and routine maintenance may be performed such as replacing the rolls of welding wire 50 or servicing the welding guns.

In the rear section of the trailer behind the second coating booth 14', a surface preparation machine storage area 56 may be provided. The surface preparation machine storage area can be used to store a plurality of surface preparation machines 22 as well as supplies for the machines. A ramp 58 is preferably provided at the rear of the trailer 12 to facilitate loading and unloading the surface preparation machines 22 and other supplies into the storage area 56.

While the illustrated embodiment shows two coating booths 14, 14', it is also possible to provide one, three, or even more smaller coating booths 14 in the trailer. The location of the various elements of the manufacturing facility may be changed. While the surface preparation machines 22 illustrated are portable machines, it is also anticipated that it may be possible to use a surface preparation machine that could be mounted in the trailer 12 through which plates 24 could be indexed in a manner similar to the way that the plates 24 are moved through the coating booths 14, 14' above.

The method of the present invention will be described below. A plate 24 or metal grating section is first placed on the ground, a support member, or floor of the trailer 12. The surface preparation machine 22 is placed on the plate 24 to clean and roughen the surface of the plate 24. The plate 24 is then placed on the loading platform 16 and fed into the coating booth 14. The welding machine 40 applies a metalized anti-slip coating on the cleaned surface. The plate 24 is indexed on a power conveyor through the coating booth 14 as the coating is applied. After applying the coating the plate is indexed out of the coating machine to the unloading platform 46 on which the coated plate 24' may be cooled and then removed to storage.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A manufacturing facility for coating a surface of a workpiece with an anti-slip coating, the manufacturing facility comprising:
    a truck trailer defining a compartment;
    a surface preparing machine for preparing the surface of the workpiece; and
    a coating machine for providing a thermal spray to form the anti-slip coating on the surface, the coating machine being disposed in the compartment;
    wherein the surface preparing machine is disposed outside the compartment when preparing the surface of the workpiece and disposed inside the compartment to facilitate transportation of the manufacturing facility.

2. The manufacturing facility of claim 1 wherein the truck trailer further comprises a first side, a second side disposed opposite the first side, a loading platform pivotally connected to the first side, and an unloading platform pivotally connected to the second side.

3. The manufacturing facility of claim 1 wherein the surface preparing machine is a shot blasting machine, a scarifier, or a grinding machine.

4. The manufacturing facility of claim 1 wherein the surface preparing machine prepares the surface of the workpiece by removing oxides from the surface and increasing the roughness of the surface.

5. The manufacturing facility of claim 1 wherein the coating machine comprises a welding gun having automatic wire feed and compressed air for directing the thermal spray.

6. The manufacturing facility of claim 5 wherein the welding gun is indexed across the workpiece as the workpiece moves through the coating machine on power operated conveyors.

7. The manufacturing facility of claim 1 wherein the coating machine is housed within a booth located inside the truck trailer that confines and ducts exhaust from the coating operation to a filtration section that cleans the exhaust prior to venting to the atmosphere.

8. The manufacturing facility of claim 1 wherein the trailer is provided with storage compartments for welding wire, surface preparation machines, and supplies.

9. The manufacturing facility of claim 1 further comprising an air compressor and motor generator.

10. The manufacturing facility of claim 1 further comprising electrical wiring and piping for compressed air.

11. The manufacturing facility of claim 10 wherein the electrical wiring includes external power connection.

12. The manufacturing facility of claim 1 wherein the workpiece is a plate made from steel, aluminum, or stainless steel.

13. The manufacturing facility of claim 1 wherein the workpiece is a grating made from steel, aluminum, or stainless steel.

14. The manufacturing facility of claim 1 wherein a coating is formed from welding wire selected the group consisting of plain steel wire, cored wire having high carbon content, aluminum wire, stainless steel wire, and nickel alloy wire.

* * * * *